Figure 1:
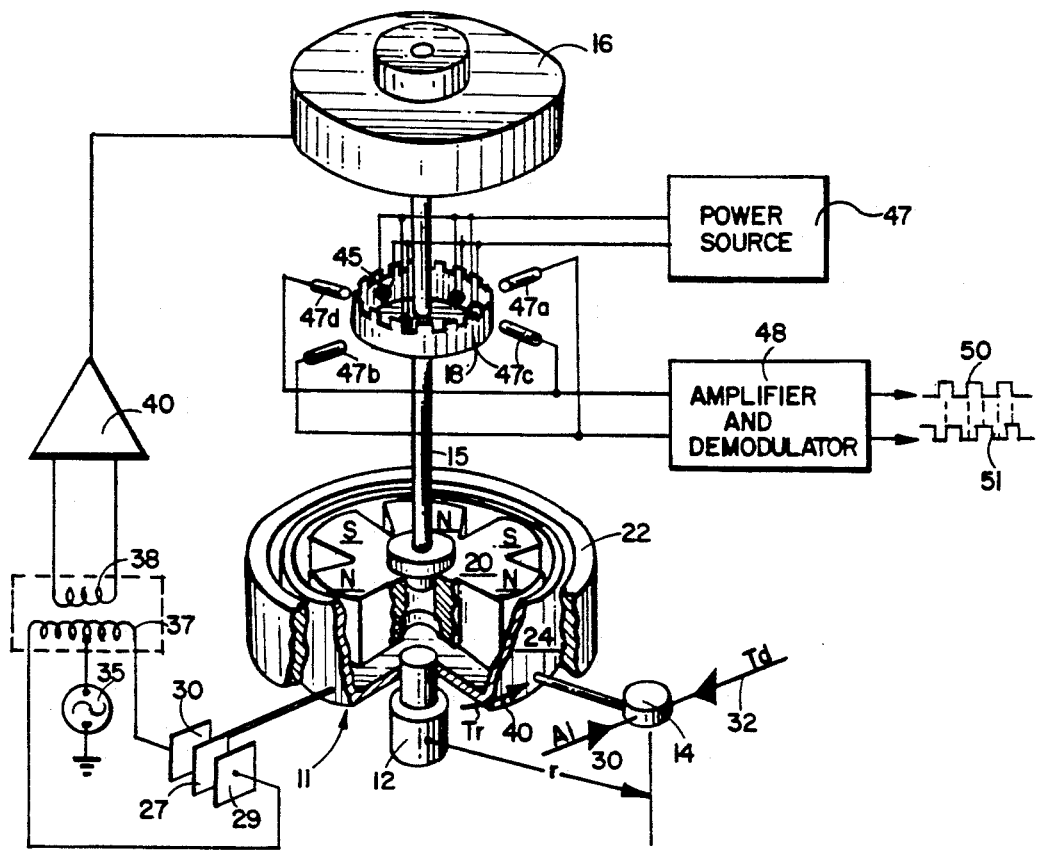

United States Patent [19]
Riggs

[11] Patent Number: 5,152,171
[45] Date of Patent: Oct. 6, 1992

[54] INDUCTION VELOCITY METER

[75] Inventor: Carl D. Riggs, Yorba Linda, Calif.

[73] Assignee: Rockwell International Corporation, Seal Beach, Calif.

[21] Appl. No.: 227,600

[22] Filed: Oct. 1, 1962

[51] Int. Cl.⁵ .............................................. G01P 3/49
[52] U.S. Cl. .................................................. 73/519
[58] Field of Search .......... 73/503, 519, 520; 324/68, 70; 64/23-28

[56] References Cited

U.S. PATENT DOCUMENTS 2,656,106 10/1953 Stabler .................................. 341/6
3,108,221 10/1963 Peltola .................................. 73/519

FOREIGN PATENT DOCUMENTS 1212770 10/1959 France .................................. 73/503

Primary Examiner—Daniel T. Pihulic
Attorney, Agent, or Firm—H. Fredrick Hamann; George A. Montanye; Tom Streeter

[57] ABSTRACT

This invention relates to an induction velocity meter and more particularly to such a device having a highly accurate digital output signal which is of simplified construction and high reliability as compared with prior art devices.

9 Claims, 2 Drawing Sheets

INDUCTION VELOCITY METER

This invention relates to an induction velocity meter and more particularly to such a device having a highly accurate digital output signal which is of simplified construction and high reliability as compared with prior art devices.

In an inertial navigation system, highly accurate velocity meters are generally utilized to produce an output signal in accordance with motion of the vehicle in which the system is carried from a predetermined starting point. Such an inertial velocity meter is described in U.S. Pat. No. 3,077,782, granted Feb. 19, 1963, to Slater et al. In the device described in the aforementioned patent application, a pendulous sensing element submerged in a liquid is supported on a low friction hydrodynamic bearing. A pickoff detects small angular motions of the pendulous sensing element with respect to the housing and provides an electrical signal to a controller. The controller supplies power to a motor which rotates a magnet in close proximity to a metallic induction element which is attached to the pendulous sensing element. A rotating magnet induces eddy currents into the induction element and a torque is applied thereto in accordance with the rotation of the magnetic assembly.

In normal operation the magnet is forced to rotate at an angular velocity which is that necessary to produce a torque on the metallic induction element to balance the torque of an input acceleration acting on the sensing element. Since the magnet coupling torque applied to the induction element is proportional to the angular velocity of the magnet, this angular velocity is proportional to the input acceleration. The angular velocity of the magnet motor drive is measured with a digital readout device providing pulse rates proportional to the angular velocity of the magnet assembly so that the number of pulses is a measure of linear velocity.

While the device of this invention utilizes the same general principles of operation as described for the aforementioned Slater et al application, it affords distinct advantages thereover by providing a simplified construction in which the instrument is divided into two halves by a fluid-tight septum. An integrator unit is contained within the case on one side of the septum, while a sensing unit is contained within the case on the other side thereof. The sensing unit includes a sensing element mounted on a fluid bearing, means for pressurizing this bearing and a pickoff for providing an output signal indicative of the direction and magnitude of rotation of the sensing element relative to the case.

The integrator unit includes a permanent magnet rotatably mounted on the case, a motor responsive to the output of the sensing unit pickoff for driving the magnet, and an optical shutter readout device having a shutter mechanism attached to the motor drive and the magnet and a photosensitive pickoff operating in conjunction with a light source for sensing rotation of the shutter relative to the case. The integrator unit further includes a printed circuit board amplifier-demodulator unit for amplifying the output of the photosensitive pickoff.

In view of the fact that the magnet assembly comprises a single magnet unit mounted on one side of the sensing element, no gearing is required in the motor drive thereby greatly simplifying this portion of the device. Also a single shaft and a set of bearings can therefore be utilized in the drive mechanism. The sensing unit and the integrating unit further can be separately fabricated as complete units and then assembled to form the instrument. In prior art devices, it was necessary that the individual parts be added one at a time in a series type operation which required complex manufacturing techniques. The two halve construction enabled by the configuration of the device of the invention greatly simplifies the manufacturing of such a precision instrument which must be finally assembled in a dust controlled area under conditions of the highest cleanliness. The two halves can be separately assembled and then once so assembled separately cleaned prior to their incorporation into the instrument.

It is therefore an object of this invention to provide an improved induction velocity meter.

It is a further object of this invention to provide an induction velocity meter of high accuracy having simplified construction.

It is still a further object of this invention to improve the reliability of an induction velocity meter.

It is still a further object of this invention to provide an induction velocity meter capable of being fabricated in two separate assemblies thereby facilitating the fabrication thereof.

Figure 2:
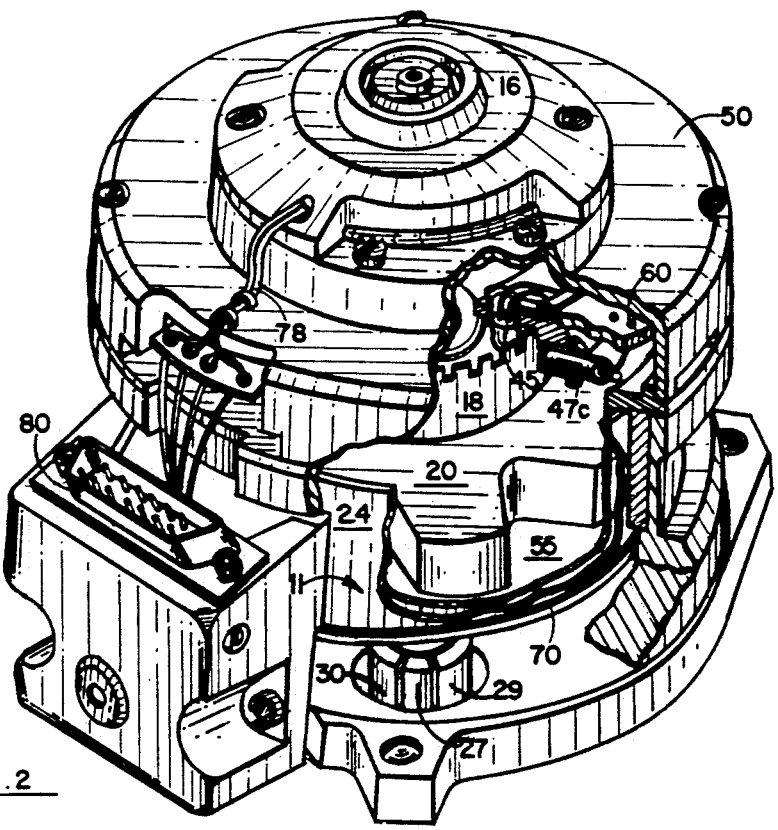
Figure 3:
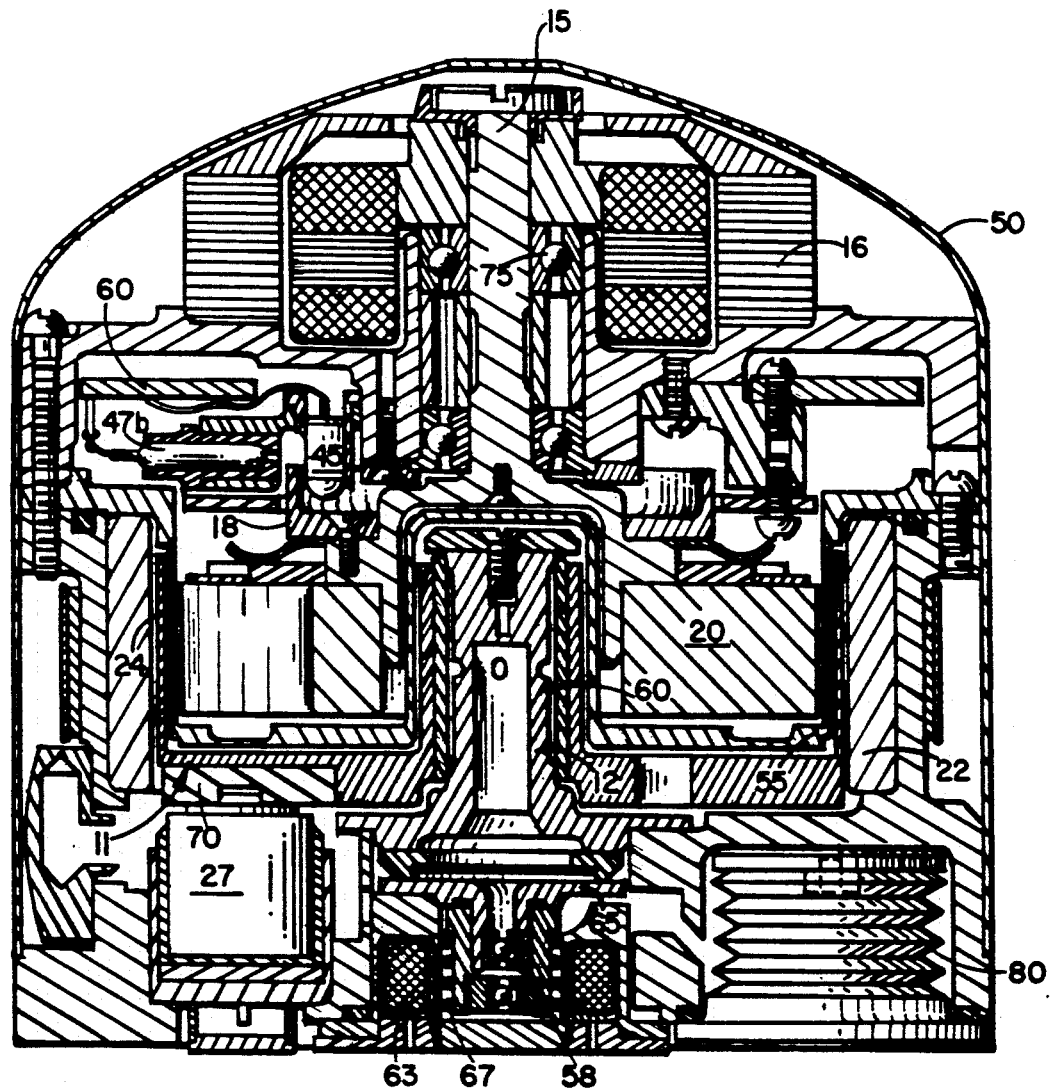

Other objects of this invention will become apparent from the following description taken in connection with the accompanying drawings of which FIG. 1 is a schematic diagram illustrating the operation of the device of the invention;

FIG. 2 is a perspective view with partial cutaway section of a preferred embodiment of the device of the invention;

And, FIG. 3 is a cross-sectional view of the embodiment shown in FIG. 2.

Referring now to FIG. 1, a schematic diagram illustrating the operation of the device of the invention is shown. Sensing element 11 is rotatably mounted on a fluid bearing formed between its central surfaces and the outer surfaces of fluid bearing shaft 12. Sensing element 11 has a mass unbalance about its rotation axis represented by mass 14 at radius r. The output shaft 15 of motor 16 is connected to rotatably drive shutter 18 and star magnet 20. Interposed between star magnet 20 and magnet flux return ring 22 is cylindrical sleeve 24 which is part of sensing unit 11. Cylindrical sleeve 24 is fabricated of a highly conductive non-magnetic material. A capacitive pickoff plate 27 is attached to sensing unit 11. Capacitive pickoff plates 29 and 30 are fixedly attached to the velocity meter case (not shown).

When the velocity meter is subjected to an input acceleration $A_i$, as indicated by arrow 30, the sensing element 11 in view of its pendulous mass 14 will be acted upon by disturbing torque $T_d$ in the direction indicated by arrow 32. This will tend to cause a displacement rotation about the rotation axis of sensing element 11 in the direction indicated by arrow 32. Such a displacement will cause pickoff plate 27 to come closer to pickoff plate 30 than plate 29. Pickoff plate 27 is connected to ground by virtue of the capacitive coupling between sensing element 11 and the fluid septum 55 (see FIG. 2) which is attached to the case 50. With pickoff plate 27 closer to plate 30 and plate 29, there therefore will be a lower impedance path from a-c source 35 to ground through the half of winding 37 closest to pickoff plate 30 then through the half of winding 37 closest to pickoff plate 29. This will produce a signal in winding 38 having a phased relationship with a reference signal and a magnitude in accordance with this displacement of pickoff plate 27. This signal is detected and amplified in phase sensing demodulator and amplifier 40 and fed to drive motor 16 at a speed and in a direction which is in accordance with this sensed pickoff signal.

The output shaft 15 of motor 16 will drive shutter 18 and star magnet 20 in accordance with this sensed signal. Magnetic flux flows from the north poles of star magnet 20 through conductive sleeve 24 to flux ring 22 and back to the south poles of the magnet, thus establishing a flux path through sleeve 24. With rotation of magnet 20, eddy currents are generated in sleeve 24 by virtue of the varying magnetic field produced. The magnetic field produced by these eddy currents reacts with the magnetic field produced by the star magnet in conjunction with flux ring 22 to produce a restoring torque $T_r$ in the direction of arrow 40. This restoring torque is substantially equal and opposite in direction to the distrubing torque $T_d$ indicated by arrow 32 and tends to counterbalance the distrubing torque to maintain sensing element 11 substantially at its original position. The magnitude of the restoring torque $T_r$ is a function of the speed of rotation of star magnet 20 which in turn is determined by the speed of rotation of shaft 15. This rotation is a function of the input acceleration $A_i$ to which the instrument is subjected.

Shutter 18, as already indicated, is fixedly attached to motor drive shaft 15. Light bulbs 45 which receive their illumination power from power source 47 are mounted on the velocity meter case (not shown) on the inside of shutter 18, while photosensitive detectors 47a–47d are attached to the case on the opposite side of shutter 18. As shutter 18 rotates, light from light bulbs 45 will alternately be passed through the shutter to photosensitive detectors 47 and then will be blocked therefrom. The output of detector 47a is connected in parallel with the output of detector 47b while the output of detector 47c is connected in parallel with the output of detector 47d. This parallel arrangement is used to assure reliability should one of the detectors become inoperative. The outputs of the parallel pairs are in quadrature relationship with each other, i.e., when one pair is receiving the full light outputs of bulbs 45 through the shutter, the other pair if half-blocked from the light source by the shutter.

The outputs from photosensitive detectors 47a–47d are fed to amplifier and demodulator 48. The output of amplifier and demodulator 48 is a pair of square wave pulse trains 50 and 51 in quadrature relationship with each other. It can be seen that for rotation of shutter 18 in one direction, that pulse train 50 will lead pulse train 51 in phase by 90° and vice-versa for rotation of the shutter in the opposite direction. Thus, the phase relationship between the output pulse trains 50 and 51 is indicative of the direction of rotation of shutter mechanism 18 which in turn is indicative of the direction of input acceleration, $A_i$. The phase relationship between pulse trains 50 and 51 can be appropriately detected in accordance with techniques well known in the art. The device of the invention thus provides a digital output signal indicative of the input acceleration. The output pulses from amplifier 48 when integrated are in accordance with the input velocity.

Referring now to FIGS. 2 and 3, a preferred embodiment of the device of the invention is shown. The instrument is divided into two portions by means of fluid tight septum 55. The top portion which may be termed the integrator unit includes drive motor 16, shutter 18, the optical pickoff means associated with the shutter which comprises light bulbs 45 and photosensitive detectors 47a–47d (see FIG. 1), the circuitry mounted on printed circuit board 60, and star magnet 20. The lower portion which may be termed the sensing unit includes sensing element 11 which is rotatably supported on a fluid bearing 60 formed between fluid bearing shaft 12 and the central portion of the sensing element, capacitive pickoff plates 27, 29, and 30 and fluid pump 58 which is used to pressurize the fluid bearing. Both the integrating unit and the sensing unit are assembled and tested separately prior to final assembly in case 50.

Fluid bearing 60 on which sensing element 11 is rotatably supported is pressurized by reciprocating pump 58 which is driven by a pulsating electrical signal fed to electromagnetic coil 63. The coil when excited draws armature 65 down and when such excitation is not present, springs 67 drive the armature up again. In this fashion, reciprocating pump action is attained when a pulsating signal is fed to coil 63. This type of pressurized bearing mechanism is described in detail in co-pending application Ser. No. 858,523 filed Dec. 9, 1959, Wilcox et al inventors.

Mass unbalance in sensing element 11 to effect the desired pendulosity is achieved by means of weight 70 which may be fabricated of tantalum and is attached to the rim of the sensing element. Motor drive shaft 15 is mounted for rotation on ball bearings 75. Shutter 18 and star magnet 20 are fixedly attached to drive shaft 15 for rotation therewith. Light bulbs 45 of which there are four (see FIG. 1) are fixedly attached to case 50 on one side of shutter 18. Photosensitive detectors 47a–47d (see FIG. 1) are fixedly attached to case 50 on opposite sides of shutter 18.

Power is fed to light bulbs 45 and an output signal is fed from the photosensitive detectors through the circuitry on circuit board 90. On circuit board 90 is included the transistor amplifier and phase sensitive demodulator circuitry 48 required to produce the output of pulse trains 50 and 51 (see FIG. 1). Power to and signals from printed circuit board 90 are fed through cable 78 to power plug 80 (FIG. 2).

Pickoff plate 27 is attached to sensing element 11 while pickoff plates 29 and 30 are mounted on case 50 and electrically insulated therefrom. Pickoff plate 27 is rotated along with sensing element 11 relative to fixed pickoff plates 29 and 30 and as explained in connection with FIG. 1 produces an output signal in accordance with this relative motion. It is to be noted that in normal operation, pickoff plate 27 only moves in the order of 2 milliradians, the servo system being such as to produce a restoring torque to the sensing element to prevent further displacement thereof. The opposing surfaces of pickoff plates 27, 29, and 30 may be anodized to prevent shorting should there accidently be any contact therebetween. In normal operation, however, no such contact should occur.

The liquid utilized for the fluid bearing circulates in the cavities within the sensing unit and provides damping for the sensing element in addition to its use for the hydrodynamic fluid bearing. An expansion bellows 80 is provided in the sensing unit to accommodate expansion of the fluid with variations in temperature. As is explained in detail in the aforementioned patent application Ser. No. 858,523, fluid bearing 60 provides both radial and thrust support for the sensing element.

The device of this invention thus can be fabricated and tested in two separate halves and then assembled to produce the final unit. No gearing is required due to the concentric configuration of both the sensing and integrating units and the motor drive shaft can be directly connected to drive both the shutter mechanism and the magnet assembly. The sensing element is hydrodynamically supported on a fluid bearing and is eddy current torqued by means of the rotating magnet assembly which is on the opposite side of a non-magnetic septum. The device of this invention thus provides an accurate velocity meter of simplified construction which has higher reliability than prior art devices.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An induction velocity meter comprising, a case, a fluid tight septum forming a recess and dividing said case into two portions, a sensing unit contained within said case on one side of said septum, said sensing unit including means mounted in said case for rotation about an axis for producing a rotation relative to said case in accordance with input acceleration, and an integrator unit contained within said case on the other side of said septum, said integrator unit comprising magnet means mounted for rotation within said case recess about said axis, servo means responsive to the rotation of said sensing unit for rotatably driving said magnet means in accordance therewith, and pickoff means for generating an output signal in accordance with the rotational drive of said magnet means.

2. The device as recited in claim 1 wherein said means for producing a rotation in accordance with input acceleration comprises a cylindrical sensing element having mass unbalance about its rotation axis, said sensing element being fabricated of a highly conductive non-magnetic material, and fluid bearing means for rotatably supporting said sensing element in said case.

3. The device as recited in claim 1 wherein said pickoff means comprises a shutter attached to said magnet means, a light source attached to said case on one side of said shutter, and photosensitive means attached to said case on the other side of said shutter, the light passing through said shutter to said photosensitive means varying in accordance with rotation of said shutter.

4. The device as recited in claim 1 wherein said servo means comprises a pickoff mounted in said case for sensing rotation of said sensing unit relative thereto, means for detecting the output of said pickoff, and motor means connected to receive the output of said detecting means for rotatably driving said magnet means.

5. An induction velocity meter comprising, a case, a fluid tight septum forming a circular recess and dividing said case into two portions, a sensing unit contained within said case on one side of said septum, an integrator unit contained within said case on the other side of said septum, said sensing unit including a sensing element, fluid bearing means for supporting said sensing element for rotation around said recess and about an axis relative to said case, a flux return ring attached to said case, around said recess, means for pressurizing said bearing means, and pickoff means for providing an output signal indicative of the direction and magnitude of rotation of said sensing element relative to said case, said integrator unit including a permanent magnet, a light shutter, means for supporting said magnet for rotation within said recess and supporting said shutter for rotation about said sensing element rotation axis, light source means attached to said case on one side of said shutter, photosensitive means for sensing the light passed through said shutter from said light source means mounted on said case on the other side of said shutter, and motor means responsively connected to said pickoff means for rotatably driving said magnet and said shutter, whereby the output of said photosensitive means is a digital signal indicative of the magnitude and direction of the acceleration sensed by said sensing unit.

6. The device as recited in claim 5 wherein said photosensitive means comprises at least two photocells spaced about said rotation axis in quadrature relationship with each other.

7. The device as recited in claim 5 wherein said magnet is a star magnet, said flux ring being mounted in close proximity to the poles thereof and providing a return flux path therefor.

8. The device as recited in claim 5 wherein said integrator unit further includes an amplifier and demodulator connected to receive the output of said photosensitive means, said amplifier and demodulator being mounted within said case.

9. The device as recited in claim 5 wherein said pickoff means comprises a first plate member attached to said sensing element and a pair of plate members on opposite sides of said first member fixedly attached to said case.

* * * * *